United States Patent
Branam (10) Patent No.: US 9,253,516 B2
(45) Date of Patent: *Feb. 2, 2016

(54) SYSTEMS, METHODS, AND COMPUTER PRODUCTS FOR PERIODIC-FEE LIMITED ACCESS TO VIDEOS

(71) Applicant: AT&T Intellectual Property I, L.P., Atlanta, GA (US)

(72) Inventor: Michael G. Branam, Lawrenceville, GA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 39 days.

This patent is subject to a terminal disclaimer.

(21) Appl. No.: 14/310,343

(22) Filed: Jun. 20, 2014

(65) Prior Publication Data

US 2014/0304723 A1    Oct. 9, 2014

Related U.S. Application Data

(63) Continuation of application No. 11/948,629, filed on Nov. 30, 2007, now Pat. No. 8,782,679.

(51) Int. Cl.
| | |
|---|---|
| H04N 21/24 | (2011.01) |
| H04N 21/2543 | (2011.01) |
| H04H 60/21 | (2008.01) |
| G06Q 30/00 | (2012.01) |
| H04L 12/14 | (2006.01) |
| H04N 7/173 | (2011.01) |
| H04N 21/239 | (2011.01) |
| H04N 21/262 | (2011.01) |
| H04N 21/472 | (2011.01) |
| H04N 21/61 | (2011.01) |
| H04N 21/254 | (2011.01) |
| H04N 21/643 | (2011.01) |

(52) U.S. Cl.
CPC ........... *H04N 21/2543* (2013.01); *G06Q 30/00* (2013.01); *H04H 60/21* (2013.01); *H04L 12/14* (2013.01); *H04N 7/17318* (2013.01); *H04N 21/2393* (2013.01); *H04N 21/2407* (2013.01); *H04N 21/2541* (2013.01); *H04N 21/25435* (2013.01); *H04N 21/26225* (2013.01); *H04N 21/472* (2013.01); *H04N 21/47211* (2013.01); *H04N 21/47214* (2013.01); *H04N 21/6125* (2013.01); *H04N 21/6175* (2013.01); *H04N 21/64322* (2013.01)

(58) Field of Classification Search
CPC .......... H04N 21/2407; H04N 21/2543; G06Q 30/00; H04L 12/14

See application file for complete search history.

(56) References Cited

U.S. PATENT DOCUMENTS

| | | |
|---|---|---|
| 7,631,323 B1 | 12/2009 | Green et al. |
| 2002/0026443 A1 | 2/2002 | Chang et al. |
| 2003/0033325 A1 | 2/2003 | Boogaard |
| 2003/0061115 A1 | 3/2003 | Wachi |
| 2004/0010602 A1 | 1/2004 | Van Vleck et al. |
| 2004/0101271 A1 | 5/2004 | Boston et al. |
| 2007/0174471 A1 | 7/2007 | Van Rossum |

*Primary Examiner* — Ricky Chin
(74) *Attorney, Agent, or Firm* — Cantor Colburn LLP (57) ABSTRACT

Systems, methods and computer products for providing periodic fee limited access to videos via Internet Protocol Television. Exemplary embodiments include a method for providing video, the method including receiving a request to download a video to a communications device via an Internet-Protocol-enabled connection, determining whether the download is permitted based on a periodic fee arrangement for providing the video to the communications device and providing the video to the communications device in response to a determination that the download is permitted.

15 Claims, 3 Drawing Sheets

SYSTEMS, METHODS, AND COMPUTER PRODUCTS FOR PERIODIC-FEE LIMITED ACCESS TO VIDEOS

CROSS-REFERENCE TO RELATED APPLICATIONS

This application is a continuation application of U.S. non-provisional application Ser. No. 11/948,629, filed Nov. 30, 2007, the contents of which are incorporated by reference herein.

BACKGROUND

The present invention relates generally to telecommunications, and more particularly, to systems, methods and computer products for providing periodic fee limited access to videos via Internet Protocol Television.

Internet protocol television (IPTV) is a digital television delivery service wherein the digital television signal is delivered to residential users via a computer network infrastructure using the Internet Protocol. Typically, IPTV services are bundled with additional Internet services such as Internet web access and voice over Internet protocol (VOIP). Subscribers receive IPTV services via a set-top box that is connected to a television or display device for the reception of a digital signal. Used in conjunction with an IP-based platform, the set-top box allows for a subscriber to access IPTV services and any additional services that are integrated within the IPTV service.

IPTV service platforms allow for an increase in the interactive services that can be provided to residential subscriber. As such, a subscriber can have access to a wide variety of content that is available via the IPTV service or the Internet. For example, a subscriber may utilize interactive services via a set top box to view IPTV content or access their personal electronic messaging accounts via an Internet web browser. The IPTV infrastructure also allows the delivery of a variety of video content instantly to the subscribers.

In previous generation cable and satellite based television delivery systems, the subscriber is limited to receiving movie content either by pre-determined programming content such as network television or cable stations such as HBO®. Subscribers can also receive movies "on-demand". Subscribers can further use digital video disks (DVD) to view movies. As such, the subscriber can view movies independent of content provided via IPTV or cable. However, the subscriber must buy a DVD or rent a DVD from a retail store or from a provider such as NETFLIX®. The physical DVD can present various problems for both the provider and the subscriber. For example, a DVD can be copied, therefore providing limited protection to the provider. The DVD is subject to damage and loss that can inconvenience both the provider and the subscriber.

There exists a need for a video delivery system that provides the selectivity and flexibility of DVDs and further provides the convenience of electronic programming provided from a provider such as a cable and IPTV provider.

BRIEF SUMMARY

Exemplary embodiments include a method for providing video, the method including receiving a request to download a video to a communications device via an Internet-Protocol-enabled connection, determining whether the download is permitted based on a periodic fee arrangement for providing the video to the communications device and providing the video to the communications device in response to a determination that the download is permitted.

Additional exemplary embodiments include a system for providing video to an Internet Protocol-enabled device, the system including a computer processing device and a periodic fee limited access to video services application executing on the computer processing device, the periodic fee limited access to video services application receiving a request to download a video to a communications device via an Internet-Protocol-enabled connection determining whether the download is permitted based on a periodic fee arrangement for providing the video to the communications device and providing the video to the communications device in response to a determination that the download is permitted.

Further exemplary embodiments include a computer program product for providing video services to an Internet Protocol-enabled device, the computer program product including instructions for causing a computer to implement a method, the method comprising receiving a request to download a video to a communications device via an Internet-Protocol-enabled connection, determining whether the download is permitted based on a periodic fee arrangement for providing the video to the communications device and providing the video to the communications device in response to a determination that the download is permitted.

Other systems, methods, and/or computer program products according to embodiments will be or become apparent to one with skill in the art upon review of the following drawings and detailed description. It is intended that all such additional systems, methods, and/or computer program products be included within this description, be within the scope of the exemplary embodiments, and be protected by the accompanying claims.

BRIEF DESCRIPTION OF DRAWINGS

Referring now to the drawings wherein like elements are numbered alike in the several FIGURES.

The detailed description explains the exemplary embodiments, together with advantages and features, by way of example with reference to the drawings.

DETAILED DESCRIPTION OF EXEMPLARY EMBODIMENTS

In exemplary embodiments, systems and methods provide a subscriber access to a limited number of videos based on the payment of a periodic fee. In exemplary embodiments, the subscriber can pay a periodic (e.g., monthly) fee. The fee amount determines how many videos (e.g., movies) to which the subscriber has access. For example, the user may pay $25/month to view any three videos at a time, or $15/month to have the right to view any two videos at a time. In exemplary embodiments, the subscriber is provided a "folder" that includes, for example, three videos. The videos are selectable by the subscriber. When the subscriber accesses the folder and selects the video, the video is streamed to the subscriber's location, for example, a set top box. The subscriber can access any video in the folder at any time. In exemplary embodiments, the folders contain pointers, which provide access to the videos for streaming to the subscriber's set top box. In further exemplary embodiment, the videos can be stored temporarily on the subscriber's digital video recorder, such as in a cache. In exemplary embodiments, the subscriber may not add more videos to their folder until they have deleted or purged a video in the folder to bring the number of videos below the paid-for number. After the subscriber has deleted the video, the next video in the subscriber's queue may be added, or the user may choose another video from the library of videos. In exemplary embodiments, the system may also allow the user to increase the number of videos in the folder and pay another fee, as opposed to requiring the user to delete a video from the folder. In addition, the subscriber may travel to another location that has access to the network, and if the user provides the correct authentication credentials, the user is able to access the folder from that location.

Figure 1:
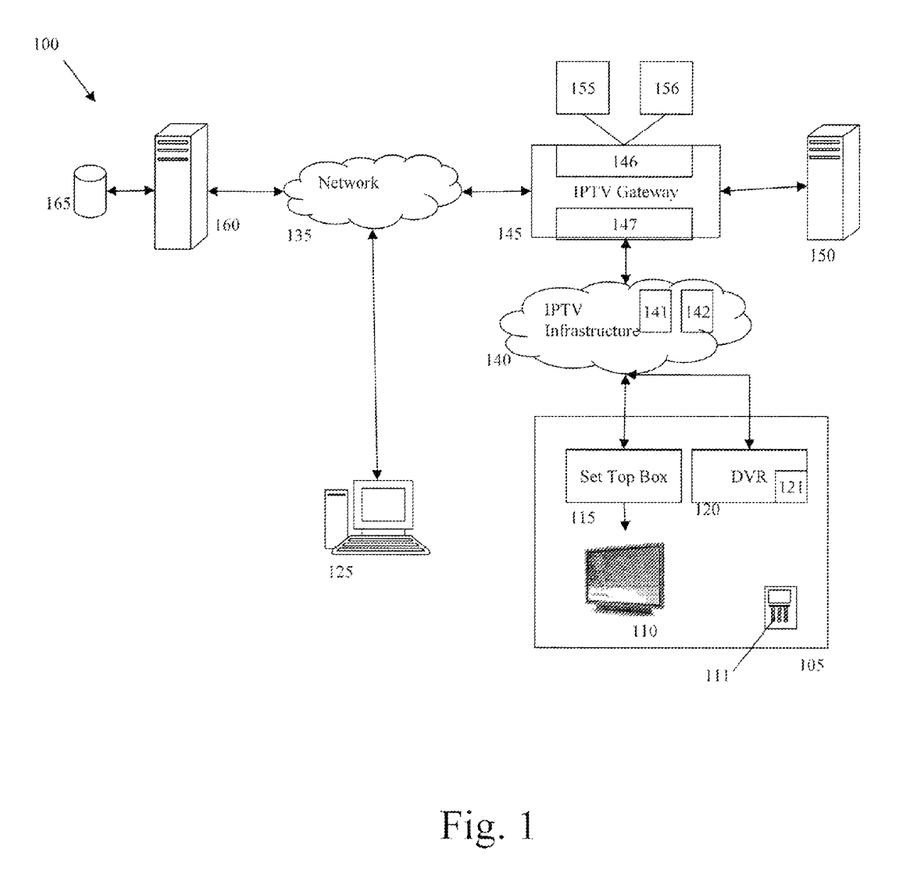
FIG. 1 illustrates a block diagram of an exemplary periodic fee limited access to video system 100.

Turning now to FIG. 1, a block diagram of an exemplary periodic fee limited access to video system 100 is now described. For ease of illustration, the system 100 of FIG. 1 depicts a simplified network infrastructure. In addition, for ease of illustration, the system 100 is described implementing an Internet Protocol Television (IPTV) system for reception of programming and scheduling. It is understood that the systems and methods described herein can implement television and program-viewing systems other than IPTV. For example, the system 100 can implement cable, satellite, and antenna.

Furthermore, it is understood that a variety of network components/nodes may be utilized in implementing the embodiment described herein. For example, in exemplary embodiments, the system 100 includes a means for accessing network services for multiple disparate devices using a single sign on procedure. Therefore, the system 100 manages accounts, each of which is established for a community of devices and/or device subscribers, such as those devices and subscribers in a subscriber location 105, which may include a communications device 110 (e.g., an IPTV-enabled television) coupled to a set top box 115. Where the communications device 110 is an IPTV-enabled television, the set top box 115 includes a processor that provides bi-directional communications between an IPTV infrastructure 140 and the communications device 110 and decodes the video streaming media received as content programming and onscreen programming information, from a content services provider system 160, discussed further below. Other services can be provided to the subscriber location 105, such as, but not limited to phone services, network services and other exemplary services such the periodic fee limited access to video services that can be implemented via the communications device 110. The accounts may thus include phone, network access and IPTV services and may be used to provide access to the periodic fee limited access to video services as described further herein. Furthermore, in exemplary embodiments, one of the devices (e.g., the communications device 110) can be provisioned for the network services described herein by associating a device identifier of the communications device with a respective account. The account, in turn, identifies each of the communications devices belonging to the community and provides other information as described herein. Furthermore, it is appreciated that other devices such as a subscriber computer 125 can be further included in the community of devices established for the subscriber location 105. It is appreciated that the subscriber computer 125 can be local to the subscriber location 105 or can represent any other remote computer that can be used to access the services described herein. It is further appreciated that other remote devices can be implemented to access the services described herein such as but not limited to a cellular telephone (e.g., a 3G cell phone), a personal computer, a laptop computer, a portable computing device (e.g., personal digital assistant), a digital music player (e.g., MP3 player), etc.

In exemplary embodiments, one of the devices, such as the communications device 110 (and the set top box 115 combination) can be used to establish account services, such as an access the periodic fee limited access to video services described herein. An account record may be generated for the subscriber at the subscriber location 105, which identifies the subscriber and the account for which the services (e.g., basic account services as described above and the periodic fee limited access to video services described herein) are accessed. Account information and records may be stored in a storage device accessible by an IPTV gateway 145, discussed below. In exemplary embodiments, the IPTV gateway 145 implements one or more applications for establishing and utilizing an access the periodic fee limited access to video services account. The access to the periodic fee limited access to video services account may thus be created for a community of communications devices (e.g., the communications device 110) to enable the communications devices to implement the access the periodic fee limited access to video services as described herein. A preferences server 150, which is coupled to the IPTV gateway 145, includes preferences information for the subscriber location 105 as described further herein.

As discussed above, the system 100 of FIG. 1 includes the subscriber location 105, such as the subscriber's household. The subscriber location 105 can include the communications device 110 (e.g., an IPTV-enabled television) in communication with the set top box 115. The subscriber location 105 can further include a personal digital recorder such as a digital video recorder (DVR) 120, which is in communication with the communication device 110 and the set top box 115. It is understood that the set top box 115 and the DVR 120 may be two separate devices or be a single integrated device. In exemplary embodiments, the DVR 120 is hard-disk based, but may have other suitable storage media such as a cache, 121. It is appreciated that the DVR 120 can have other suitable memory devices for receiving and storing programming and scheduling data. Therefore, a "memory" or "recording medium" can be any means that contains, stores, communicates, propagates, or transports the program and/or data for use by or in conjunction with an instruction execution system, apparatus or device. Memory and recording medium can be, but are not limited to, an electronic, magnetic, optical, electromagnetic, infrared or semiconductor system, apparatus or device. Memory an recording medium also includes, but is not limited to, for example the following: a portable computer diskette, a random access memory (RAM), a read-only memory (ROM), an erasable programmable read-only memory (EPROM or flash memory), and a portable compact disk read-only memory or another suitable medium upon which a program and/or data may be stored.

The subscriber location 105 can further include a remote control 111 for control and navigation of the communications device 110, which can be used to select and view videos on the communications device 110. As discussed above, the subscriber location 105 can further include one or more remote devices in its community of devices. For example, the remote devices can include the remote computer 125. In exemplary embodiments, the remote subscriber computer 125 can be part of the subscriber location 105 or a computer that is accessed remotely in order to access the periodic fee limited access to video services for control, management and scheduling of video content from the content provider 160 to the subscriber location 105 for rendering on the communications device 110. It is therefore appreciated that access to the periodic fee limited access to video services can be managed from locations remote to the subscriber location 105. It is understood by those skilled in the art that the remote subscriber computer 125 can include input and output devices, such as but not limited to a mouse, a keyboard, etc. As discussed further below, the aforementioned devices can all interact with the IPTV infrastructure 140 and the IPTV gateway 145. It is appreciated that any of the aforementioned devices can implement the periodic fee limited access to video services. In exemplary embodiments, the communications devices herein can have a network address associated with the communications devices such as an addressable uniform resource locator (URL), an Internet address, etc.

In exemplary embodiments, the system 100 can manage and view videos through the subscriber's IPTV-enabled device, such as the communications device 110, via the set top box 115, the remote devices (e.g., the remote subscriber computer 125) or other suitable device. As such, to coordinate IPTV communication, the system 100 may further include the IPTV gateway 145 that is in communication with the IPTV infrastructure 140. The IPTV infrastructure 140 and the IPTV gateway 145 are used in conjunction to communicate via a network 135. For example, a suitable device (e.g., the communications device 110) at the subscriber location 105 can implement the IPTV infrastructure 140 and the IPTV gateway 145 to communicate with the content server 160.

The network 135 can be an IP-based network for communication between the content server 160 and the subscriber location 105 using communication devices such as but not limited to the communications device 110 (via the set top box 115, for example). The network 135 can be implemented to transmit content from the content server 160 to the subscriber location 105 via a broadband connection, for example. In exemplary embodiments, the network 135 can be a managed IP network administered by a service provider. The network 135 can also be implemented in a wireless fashion, e.g., using wireless protocols and technologies, such as Wi-Fi, Wi-Max, etc. The network 135 can also be a cellular communications network, a fixed wireless network, a wireless local area network (LAN), a wireless wide area network (WAN), a personal area network (PAN), intranet, metropolitan area network, Internet network, or other similar type of network environment or other suitable network system and includes equipment for receiving and transmitting signals. In other exemplary embodiments, the network 135 can be a circuit-switched network such as a standard public switched telephone network (PSTN).

In exemplary embodiments, the IPTV infrastructure 140 can be an IP-based network that receives network data (e.g., videos) from the content server 160 and the preferences server 150, and delivers the network data to the set top box 115 for display or other rendering on the communications device 110. Alternatively, the network data can be for display or rendering on the remote subscriber computer 125 or other suitable device.

In exemplary embodiments, as discussed above, the IPTV infrastructure 140 provides an interface between the subscriber location 105 and the IPTV gateway 145. In exemplary implementations, a notification server 141 and a terminal server 142 operate to interface communication between the subscriber location 105 via the set top box 115, and the IPTV gateway 145. For example, in exemplary implementations, the set top box 115 can provide a unique identification number so that the IPTV gateway 145 can route the network data to the set top box 115. The IPTV gateway 145 provides an interface between the content server 160, the IPTV infrastructure 140 and the subscriber location 105. Furthermore, in exemplary embodiments, the IPTV gateway 145 handles notifications (e.g., via email) to the IPTV subscriber location 105 and can further provide a history of the notifications. For example, as described further below, when the subscriber selects videos for viewing, the selected video request can be sent to the content server 160 from the subscriber location 105 as an email message via the IPTV gateway 145. In addition, any confirmation message sent from the content server 160 can be sent to the subscriber location 105 as an email message via the IPTV gateway 145. Furthermore, when the subscriber sets up his/her desired periodic fee limited access to videos services on the communications device 110 (or other device in subscriber location, remote device, etc.), one of the network components of the system 100 (e.g., the set top box 115, the IPTV gateway 145, the host server 125) can store specific scheduling information that the subscriber has created. Any changes to the information can be passed between the subscriber location 105 and the content server 160 via messages as described. In addition, the subscriber can access and manipulate desired periodic fee limited access to videos information via an interface (see FIG. 3 below) that can be rendered on one of the communications devices such as the communications device 110. The interface can be stored locally on the set top box 115 or on the IPTV gateway 145.

In exemplary embodiments, the IPTV gateway 145 can further interface with the various system 100 elements as described herein. For example, the IPTV gateway 145 is in communication with the preferences server 150 to pass notifications and messages (e.g., email messages) regarding permissions to create and edit the periodic fee limited access to videos services information. For example, different members of the subscriber location 105 who share account services may have different viewing schedules. For example, one member may have a unique viewing schedule and another member may have a second unique viewing schedule with little to no overlap with the first viewing schedule. As such, each member can retrieve and edit those different schedules and be properly authenticated to retrieve and edit those schedules.

In exemplary embodiments, the IPTV gateway 145 can include a back end 146 and a front end 147. The front end 147 can be used to implement various provisioning activities such as but not limited to initial provisioning of IPTV addresses for the devices at subscriber location 105. The back end 146 can be implemented for many of the periodic fee limited access to videos services, such as communicating with the content server 160 and retrieving viewing data from a database 165 and passing messages and notification to the IPTV gateway 145. As such, the back end 146 can include various elements including but not limited to a caller ID handler, SMS handler, message handler, provisioning handler, etc.

In exemplary embodiments, the IPTV gateway 145 may implement authentication using a high-speed processing device (e.g., a computer system) that is capable of handling high volume activities conducted via communications devices, and other network entities (e.g., parts of the IPTV infrastructure 140, network 135) via one or more networks (e.g., the IPTV infrastructure 140). The IPTV gateway 145 receives requests from one or more devices from the subscriber location 105 to access network services, such as the periodic fee limited access to videos services. The IPTV gateway 145 may implement authentication software for restricting or controlling access to network. The IPTV gateway 145 may be in communication with a customer identity system (CIS) database, which stores subscriber credentials (e.g., subscriber names and passwords) established via the periodic fee limited access to videos services account.

In exemplary embodiments, the system 100 can further include a periodic fee limited access to videos services application 155 that can reside on the IPTV gateway 145. In exemplary embodiments, the periodic fee limited access to videos services application 155 can be implemented by the subscriber to set up a folder 156 to store data that is related to the videos that the subscriber has identified for viewing based on the paid fee. As discussed above, when the subscriber accesses the folder 156 and selects the video, the video is streamed to the subscriber's location 105, for example, to the set top box 115, for rendering on the communications device 110. In exemplary embodiments, the folders 156 contain pointers to the content server 160, and specifically to a video residing on the database 165. The pointers, in turn, provide access to the videos stored in the database 165 for streaming to the subscriber's set top box 115. In further exemplary embodiment, the videos can be stored temporarily on the subscriber's digital video recorder 120, such as in the cache 121. For example, the content can be trickle charged to the DVR 120 and subsequently deleted as the subscriber views the video. To prevent unauthorized copying, only a limited portion of the video is trickle charged and subsequently deleted as the video is viewed, according to exemplary embodiments. In this way, the subscriber has limited capabilities, such as pause and rewind, while still being prevented from copying the content. Furthermore, in exemplary embodiments, the subscriber may not add more videos to their folder 156 until they have deleted or purged a video in the folder to bring the number of videos below the paid-for number. After the user has deleted the video, the next video in the subscriber's queue may be added, or the user may choose another video from the library of videos.

In exemplary embodiments, if the interface that provides access to the folder 156 is stored on the IPTV gateway 145, messages and notifications can be passed between the subscriber location 105 and the IPTV gateway 145 that include present scheduling and historic scheduling that the subscriber has created in the past. Furthermore, if any changes in the subscribers scheduled videos have occurred, messages can be passed to the subscriber location 105 (or the remote device 125) to notify the subscriber that a program scheduled to be viewed has changed. The subscriber can make changes accordingly.

In exemplary embodiments, as discussed above, the system 100 further includes the content server 160, which is in communication with the IPTV gateway 145 via the network 135. In exemplary embodiments, the content server 160 is implemented by a host system (e.g., a high-speed processing device) that provides content to its subscribers (e.g., a subscriber of the communications device 110), such as television programs, premium programming services, video on demand content, and Internet/Web content (e.g., podcasts, streaming media, etc.) and videos requested via the periodic fee limited access to videos services. In exemplary embodiments, the content is transmitted to the subscribers (e.g., at the subscriber location 105) via a broadband connection over an Internet Protocol (IP)-based network (e.g., the network 135). The content server 160 can also provide an onscreen programming guide to subscribers that provides information about current and future programming available via the content providers' services, such as videos that are to be available in the future. Programming information provided by the onscreen programming guide may include current and future program listings including but not limited to program titles, primary actors/actresses, begin time, duration of program, a year in which the program was produced, and a brief text description of the program. The programming guide can further provide access to the videos available via the periodic fee limited access to videos services.

In exemplary embodiments, the content server 160 is coupled to the database 165, which can include the videos for viewing as discussed. In addition, the database 165 can include one or more playlists for available videos. In one implementation, the database 165 may also be representative of a given play list for certain available videos. A play list can be associated with a particular program screen. For example, a play list can be generated for a given screen that is displayed for a view on the communications device 110. As a subscriber is browsing through videos for selection, a different play list is accessed by and displayed on the communications device 110 from the content server 160. In exemplary embodiments, play lists can include programming content, as well as programming schedules for the content (e.g., onscreen programming guide information). In exemplary embodiments, the database 165 stores records of programming events scheduled for transmission to customers, such as communications device. These records, in turn, can be used in conjunction with the periodic fee limited access to videos services to schedule viewings. In exemplary embodiments, access to the database 165 and the associated communication between the database 165 and the subscriber location 105 can be implemented by the periodic fee limited access to videos services application 155 via pointers stored in the folder 156.

In exemplary embodiments, upon a request from the subscriber location 105, the IPTV gateway 145 can coordinate obtaining the video from the database 165 and provide the acquired data (e.g., playlists and selected videos) for display and rendering at the subscriber location 105. As described, the coordination of acquiring the data and ultimately displaying the data on the communications device 110 (or other device) is implemented via the periodic fee limited access to videos services application 155. Furthermore, the periodic fee limited access to videos services application 155 coordinates the transfer of the program data from the database 165 for rendering on the communications device 110. It is appreciated that since the content is either streamed via a pointer form the folder 156 or trickled charged to the DVR 120, the content is unavailable to the subscriber for actual recording, according to exemplary embodiments. As such, the provider of content server 160 has protection from unauthorized copying of the content.

Figure 2:
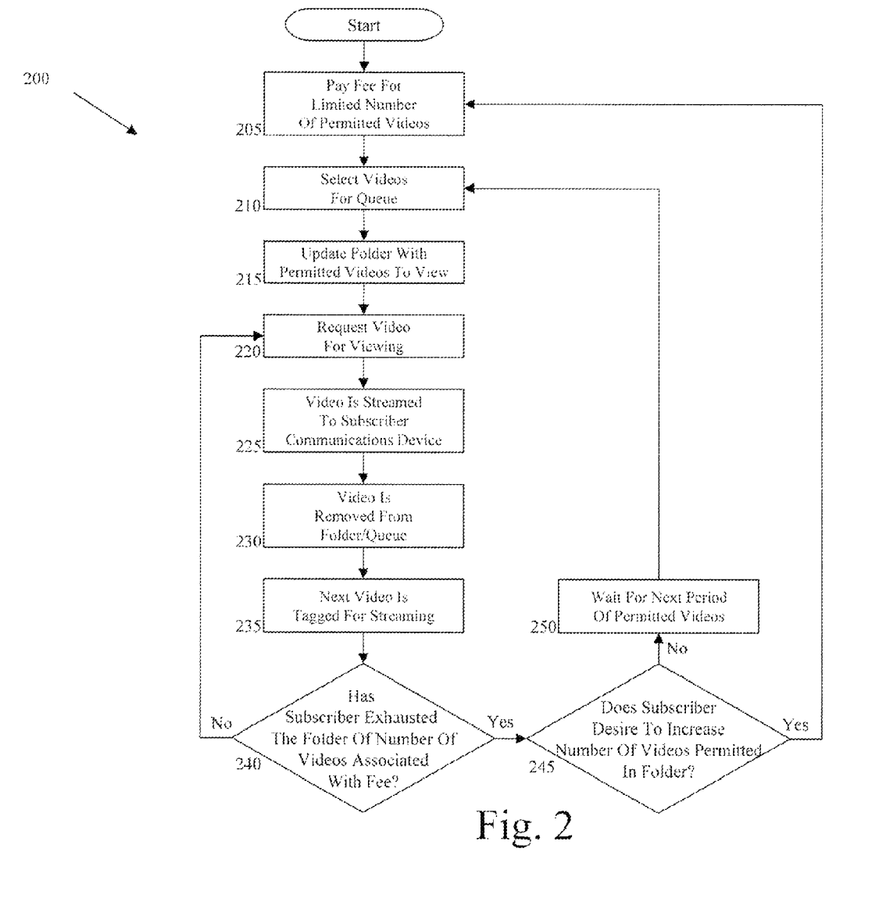
FIG. 2 illustrates a flow chart for a periodic limited access to video methodology in accordance with exemplary embodiments.

FIG. 2 illustrates a flow chart for a periodic limited access to video methodology 200 in accordance with exemplary embodiments. As discussed above, the subscriber can pay a fee for a limited number of videos permitted to be viewed during a particular time period at step 205. For example, the subscriber can pay $25 to view three videos at any time during a one month period. In exemplary embodiments, the subscriber can create a queue into which the subscriber can select an unlimited number of videos for future viewing. It is appreciated that the queue can be created by implementing the periodic fee limited access to videos services application 155. The queue can therefore be associated with the periodic fee limited access to videos services application 155 and the folder 156. At step 210, the subscriber can select videos for placement into the queue. At step 215, the subscriber can then update the folder 156 with the permitted number of videos to view. At a time when the subscriber desires to view a video, the subscriber can request a video for viewing at step 220. As described above, the subscriber can select videos for placement in the queue or the folder 156 and for viewing via a periodic fee limited access to videos services interface (see FIG. 3 below). Once the subscriber requests a video for viewing, the video is streamed to the subscriber's communications device 110 at step 225. As described above, the content server 160 provides the video from the database 165 and streams the video via the IPTV gateway 145 and IPTV infrastructure 140 to the set top box 115. A pointer provided in the folder 156 provides the necessary data structures to provide the streaming of the video without actually having to store the video on the DVR 120 for example. As such, the content provider is protected from unauthorized copying of the video. In addition, it is appreciated that if the subscriber does not have a DVR, such as the DVR 120, the video can still be provided by streaming. In other exemplary embodiments, the video can be trickle charged to the DVR 120 (e.g., the cache 121) and erased upon viewing. In this way, the subscriber has limited ability to pause and rewind the video, without having full access to the video.

In exemplary embodiments, upon viewing the video, the video selection is deleted from the folder 156 and the queue at step 230. At step 235, the next video is tagged for viewing. For example, if the subscriber has put one video into the folder 156 at step 215, but has placed a large number of videos into the queue, the next movie in the queue is placed into the folder 156. At step 240, the methodology 200 determines if the subscriber has exhausted the folder 156 of the number of permitted videos associated with the fee that the subscriber paid for a given period (e.g., one month) at step 205. If the subscriber has not exhausted the number of permitted videos, then the user can request the next video for viewing at step 220. If the user has exhausted the number of permitted videos for that period, the subscriber can be prompted whether or not the subscriber would like to increase the number of permitted videos for that period at step 245. If the subscriber does desire to increase the number of videos, the subscriber can pay a new fee at step 205, and the subsequent steps can be repeated. If the subscriber does not want to increase the number of permitted videos for the period at step 245, then at step 250, the subscriber waits for the next period to begin in which new videos can be selected at step 210. It is appreciated that the user does not necessarily have to select any new videos for the queue at step 210, so the flow can proceed to step 215 and the subsequent steps. It is further appreciated that the subscriber can be billed for each period in a number of ways known in the art, such as but not limited monthly billing from the content provider.

Figure 3:
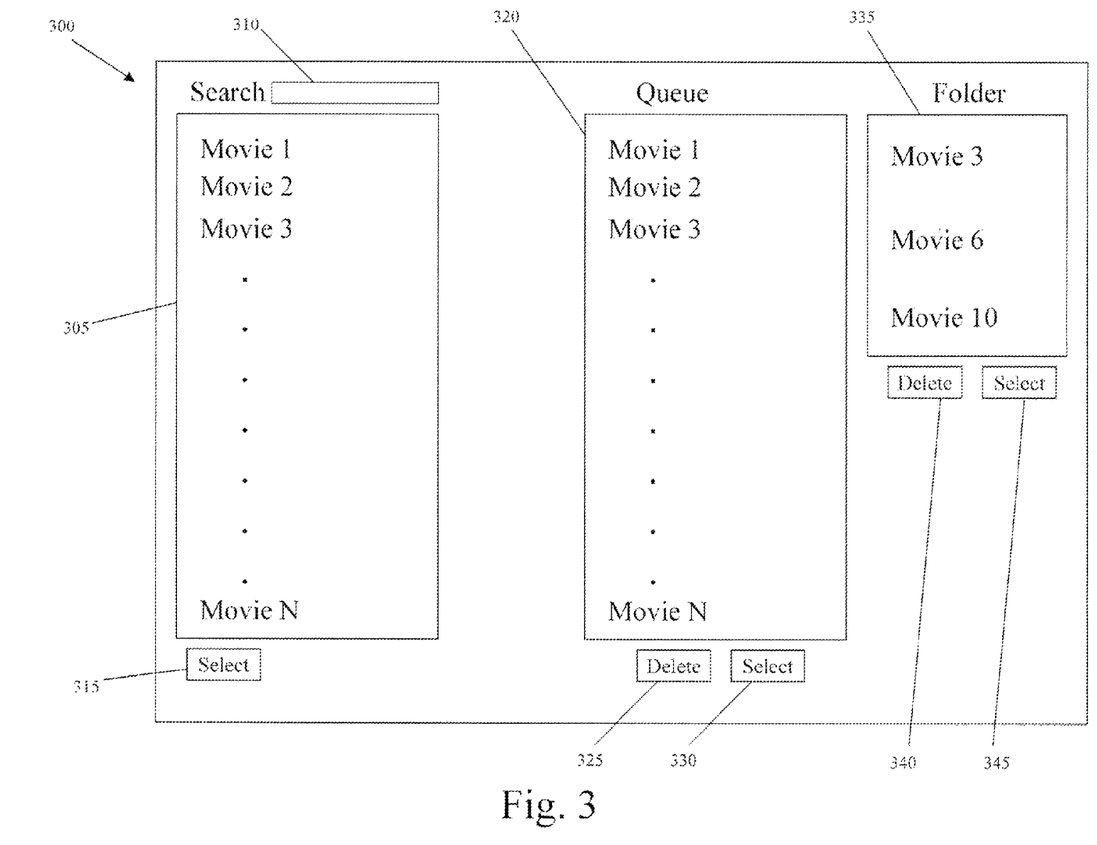
FIG. 3 illustrates a screen shot an exemplary periodic fee limited access to video interface.

FIG. 3 illustrates a screen shot of an exemplary periodic fee limited access to video interface 300, which can be accessed and displayed on the communications device 110, or any of the other subscriber devices at the subscriber location 105. As described above, the subscriber can select videos from a listing provided by the content server 160 from the database 165. In exemplary embodiments, the listing can be stored locally on the set top box 115 or on the IPTV gateway 145 via the periodic fee limited access to videos services application 155, and be locally accessed to populate a listings field 305 on the interface 300. The listing can be periodically updated by the content server 160. In exemplary embodiments, the subscriber can search through the listing via a search field 310 by entering various criteria types including, but not limited to movie title, actors, genre, key words, etc. It is appreciated that there are various search methods known in the art that can be implemented for the search field 310. The user can use a select key 315 to place a video into a queue field 320. It is appreciated that the subscriber can navigate the interface 300 with the remote control 111 when the interface is displayed on the communications device 110. The user can selectively delete videos from the queue field 320 by marking the selection and pressing a delete button 325. The subscriber can further use a select button 330 to place videos into a folder field 335. Similarly, the user can use a select button 345 to view a video. When the select button 345 is pressed, the video is streamed to the subscriber location 105 as described above, according to exemplary embodiments. The subscriber can also use a delete button 340 to selectively remove videos from the folder field 335. It is appreciated that the interface 300 as illustrated is for illustrative purposes. Those skilled in the art appreciate that other layouts of the interface 300 may be provided As described above, the exemplary embodiments can be in the form of computer-implemented processes and apparatuses for practicing those processes. The exemplary embodiments can also be in the form of computer program code containing instructions embodied in tangible media, such as floppy diskettes, CD ROMs, hard drives, or any other computer-readable storage medium, wherein, when the computer program code is loaded into and executed by a computer, the computer becomes an apparatus for practicing the exemplary embodiments. The exemplary embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an apparatus for practicing the exemplary embodiments. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method for providing video, the method comprising:

receiving a request to download the video to a communications device of a user at a subscriber location;

determining, by a television gateway, whether a download is permitted based on a periodic fee arrangement for providing the video to the communications device;

determining whether to add a pointer to the video in a folder of the user, the folder of the user stored in the television gateway without storing the video in the communications device at the subscriber location, the folder comprising a paid-for number of slots in advance for which pointers to videos can be added to fill the paid-for number of slots that are available in the folder stored in the television gateway;

wherein the folder stored in the television gateway comprises the pointers to the videos that the user has paid for the right to stream to the communications device according to the paid-for number of slots;
adding the pointer to the video in the folder stored in the television gateway to fill one of the paid-for number of slots when the paid-for number of slots are not filled;
wherein the paid-for number of slots and the pointers to the videos in the folder have a one-to-one relationship in that one pointer to one video in the folder is removed to add a next pointer to a next video in the folder from queued videos in a user queue;
wherein according to the paid-for number of slots in the periodic fee arrangement, the pointers in the folder stored in the television gateway provide streaming access to the videos stored in a content server;
wherein the user queue comprises the queued videos that the user desires to watch but cannot watch until the next video from the queued videos is added to fill one of the paid-for number of slots that becomes open in the folder stored in the television gateway;
wherein the queued videos in the user queue cannot be viewed by the user;
wherein the queued videos in the user queue are not the paid-for number of slots; and
providing the video to the communications device in response to a determination that the download is permitted.

2. The method of claim 1, wherein the download of the video is permitted upon a determination that a fee has been paid and that a prior number of video downloads is not in excess of a predetermined number.

3. The method of claim 1, wherein the download of the video is permitted upon a determination that a fee has been paid, and that a prior number of video downloads is not in excess of a predetermined number during a predetermined time period.

4. The method of claim 1, further comprising accessing the folder to determine a location of the video to retrieve in order to provide the video to the communications device.

5. The method of claim 4, wherein the folder includes the pointer to the video in a database.

6. The method of claim 1, wherein providing the video to the communications device comprises streaming the video to the communications device.

7. The method of claim 1, wherein providing the video to the communications device comprises trickle charging the video to a device coupled to the communications device.

8. An apparatus of a television gateway for providing video, the apparatus comprising:
a processor;
memory comprising computer-executable instructions, the computer-executable instructions, when executed by the processor, cause the processor to perform operations comprising:
receiving a request to download the video to a communications device of a user at a subscriber location;
determining, by the processor, whether a download is permitted based on a periodic fee arrangement for providing the video to the communications device; determining whether to add a pointer to the video in a folder of the user, the folder of the user stored in the television gateway without storing the video in the communications device at the subscriber location, the folder comprising a paid-for number of slots in advance for which pointers to videos can be added to fill the paid-for number of slots that are available in the folder stored in the television gateway;
wherein the folder stored in the television gateway comprises the pointers to the videos that the user has paid for the right to stream to the communications device according to the paid-for number of slots;
adding the pointer to the video in the folder stored in the television gateway to fill one of the paid-for number of slots when the paid-for number of slots are not filled;
wherein the paid-for number of slots and the pointers to the videos in the folder have a one-to-one relationship in that one pointer to one video in the folder is removed to add a next pointer to a next video in the folder from queued videos in a user queue;
wherein according to the paid-for number of slots in the periodic fee arrangement, the pointers in the folder stored in the television gateway provide streaming access to the videos stored in a content server;
wherein the user queue comprises the queued videos that the user desires to watch but cannot watch until the next video from the queued videos is added to fill one of the paid-for number of slots that becomes open in the folder stored in the television gateway;
wherein the queued videos in the user queue cannot be viewed by the user;
wherein the queued videos in the user queue are not the paid-for number of slots; and
providing the video to the communications device in response to a determination that the download is permitted.

9. The apparatus of claim 8, wherein the download of the video is permitted upon a determination that a fee has been paid and that a prior number of video downloads is not in excess of a predetermined number.

10. The apparatus of claim 8, wherein the download of the video is permitted upon a determination that a fee has been paid, and that a prior number of video downloads is not in excess of a predetermined number during a predetermined time period.

11. The apparatus of claim 8, wherein the folder is accessed to determine a location of the video to retrieve in order to provide the video to the communications device.

12. The apparatus of claim 11, wherein the folder includes the pointer to the video in a database.

13. The apparatus of claim 8, wherein providing the video to the communications device comprises streaming the video to the communications device.

14. The apparatus of claim 8, wherein providing the video to the communications device comprises trickle charging the video to a device coupled to the communications device.

15. A non-transitory computer readable storage medium for providing video services, the computer readable storage medium including instructions that, when executed by a computer, cause the computer to perform operations comprising:
receiving a request to download the video to a communications device of a user at a subscriber location;
determining, by a television gateway, whether a download is permitted based on a periodic fee arrangement for providing the video to the communications device;
determining whether to add a pointer to the video in a folder of the user, the folder of the user stored in the television gateway without storing the video in the communications device at the subscriber location, the folder comprising a paid-for number of slots in advance for which pointers to videos can be added to fill the paid-for number of slots that are available in the folder stored in the television gateway;
wherein the folder stored in the television gateway comprises the pointers to the videos that the user has paid for the right to stream to the communications device according to the paid-for number of slots;

adding the pointer to the video in the folder stored in the television gateway to fill one of the paid-for number of slots when the paid-for number of slots are not filled;

wherein the paid-for number of slots and the pointers to the videos in the folder have a one-to-one relationship in that one pointer to one video in the folder is removed to add a next pointer to a next video in the folder from queued videos in a user queue;

wherein according to the paid-for number of slots in the periodic fee arrangement, the pointers in the folder stored in the television gateway provide streaming access to the videos stored in a content server;

wherein the user queue comprises the queued videos that the user desires to watch but cannot watch until the next video from the queued videos is added to fill one of the paid-for number of slots that becomes open in the folder stored in the television gateway;

wherein the queued videos in the user queue cannot be viewed by the user;

wherein the queued videos in the user queue are not the paid-for number of slots; and providing the video to the communications device in response to a determination that the download is permitted.

* * * * *